United States Patent
Alshinnawi et al.

(10) Patent No.: US 10,178,621 B2
(45) Date of Patent: Jan. 8, 2019

(54) AUTOMATIC NOTIFICATION PROVIDING SLEEP STATE PROTECTION FOR AN UNATTENDED COMPUTING DEVICE

(71) Applicant: Lenovo Enterprise Solutions (Singapore) Pte. Ltd., Singapore (SG)

(72) Inventors: Shareef F. Alshinnawi, Apex, NC (US); Jeffrey S. Holland, Newton, NC (US); Bejoy J. Kochuparambil, Apex, NC (US); Aparna Vallury, Apex, NC (US)

(73) Assignee: Lenovo Enterprise Solutions (Singapore) Pte. Ltd., Singapore (SG)

( * ) Notice: Subject to any disclaimer, the term of this patent is extended or adjusted under 35 U.S.C. 154(b) by 214 days.

(21) Appl. No.: 15/145,294

(22) Filed: May 3, 2016

(65) Prior Publication Data

US 2017/0325170 A1    Nov. 9, 2017

(51) Int. Cl.
| | |
|---|---|
| *H04W 52/02* | (2009.01) |
| *H04W 4/12* | (2009.01) |
| *H04W 24/02* | (2009.01) |
| *G06F 1/20* | (2006.01) |
| *H04M 1/725* | (2006.01) |

(52) U.S. Cl.
CPC ........ *H04W 52/0251* (2013.01); *G06F 1/203* (2013.01); *H04M 1/7253* (2013.01); *H04W 4/12* (2013.01); *H04W 24/02* (2013.01); *Y02D 70/142* (2018.01); *Y02D 70/144* (2018.01); *Y02D 70/166* (2018.01); *Y02D 70/26* (2018.01)

(58) Field of Classification Search
CPC .... G06F 1/1616; G06F 1/1677; G06F 1/3203; G06F 1/203; H04W 52/0251; H04W 24/02; H04W 4/12; H04W 52/0261; H04M 1/7253; Y02D 70/26; Y02D 70/144; Y02D 70/142; Y02D 70/166
USPC .............................................. 455/574, 575.3
See application file for complete search history.

(56) References Cited

U.S. PATENT DOCUMENTS

2010/0103116 A1*  4/2010  Leung .................. G06F 1/1616
                                                    345/173
2012/0208602 A1*  8/2012  Tsubokawa ....... H04W 52/0254
                                                    455/566

OTHER PUBLICATIONS

James R. Williams Zavada, "My UPS Network Notification System", www.Jrwz.net/technical/ups-nns.html, Copyright 1999-2016 James R. Williams Zavada, Feb. 10, 2016, 1 page.

(Continued)

*Primary Examiner* — Eugene Yun
(74) *Attorney, Agent, or Firm* — Jeffrey L. Streets (57) ABSTRACT

A method of a first mobile computing device includes storing a wireless communication address of a second mobile computing device, determining that the first mobile computing device has left a sleep state while in a closed condition, and automatically wirelessly transmitting a notification to the second mobile computing device in response to determining that the first mobile computing device has left the sleep state while in a closed condition. A method of a second mobile computing device includes receiving a wireless notification from a first mobile computing device indicating that the first mobile computing device has left a sleep state while in a closed condition, and providing an alert to a user of the second mobile computing device in response to receiving the wireless notification.

21 Claims, 4 Drawing Sheets

(56) References Cited

OTHER PUBLICATIONS

Microsoft, "System Power Management Events", https://msdn.microsoft.com, Windows Dev Center, Feb. 10, 2016, 3 pages.
Whitson Gordon, "Why Is My Laptop So Hot and What Can I Do About It?" LifeHacker, www.lifehacker.com, Feb. 15, 2012, 9 pages.

* cited by examiner

FIG. 6

AUTOMATIC NOTIFICATION PROVIDING SLEEP STATE PROTECTION FOR AN UNATTENDED COMPUTING DEVICE

BACKGROUND

Field of the Invention

The present invention relates to methods of managing the operating state of a computing device.

Background of the Related Art

Many users of mobile computing devices store or transport their devices, such as laptop computers and tablet computers, by simply placing them into a sleep state rather than shutting them down. While in sleep state, the device enters a lower energy state to conserve power. Unfortunately, a mobile computing device may not always remain in sleep state and exiting the sleep state causes an increase in the power consumption of the mobile computing device.

The increased power consumption may quickly cause an increase in the component temperatures within the mobile computing device. The mobile computing device is typically designed to maintain temperatures within a desired operating range, but such cooling systems may be ineffective if the device is placed into a physically constrained environment where there is inadequate cooling, such as a backpack, suitcase, or any other unventilated transportation device. Modern mobile computing devices are able to protect themselves by throttling components or shutting down to protect themselves, but these shutdowns are often "hard" shutdowns that do not back-up data or follow necessary shutdown procedures that allow the device to reboot error-free. Over time, these hard shutdowns, and the scenarios that create them, may degrade the device performance. In addition to potentially damaging the device, the loss of battery charge and the extended amount of recovery boot time makes the device less usable.

BRIEF SUMMARY

One embodiment of the present invention provides a method of a first mobile computing device. The method comprises storing a wireless communication address of a second mobile computing device, determining that the first mobile computing device has left a sleep state while in a closed condition, and automatically wirelessly transmitting a notification to the second mobile computing device in response to determining that the first mobile computing device has left the sleep state while in a closed condition.

Another embodiment of the present invention provides a computer program product comprising a non-transitory computer readable storage medium having program instructions embodied therewith, wherein the program instructions are executable by a processor to cause the processor to perform a method of a first mobile computing device. The method comprises storing a wireless communication address of a second mobile computing device, determining that the first mobile computing device has left a sleep state while in a closed condition, and automatically wirelessly transmitting a notification to the second mobile computing device in response to determining that the first mobile computing device has left the sleep state while in a closed condition.

Yet another embodiment of the present invention provides a method of a second mobile computing device. The method comprises receiving a wireless notification from a first mobile computing device indicating that the first mobile computing device has left a sleep state while in a closed condition, and providing an alert to a user of the second mobile computing device in response to receiving the wireless notification.

DETAILED DESCRIPTION

One embodiment of the present invention provides a method of a first mobile computing device. The method comprises storing a wireless communication address of a second mobile computing device, determining that the first mobile computing device has left a sleep state while in a closed condition, and automatically wirelessly transmitting a notification to the second mobile computing device in response to determining that the first mobile computing device has left the sleep state while in a closed condition.

The first mobile computing device may be, without limitation, a laptop computer having a base and a hinged display screen that may be in an open condition or the closed condition relative to the base. In a second example, the first mobile computing device may be a tablet computer secured to a hinged cover or case that may be in an open condition or the closed condition relative to the tablet computer. In a third example, the first mobile computing device may be a smartphone or a tablet computer that may be in an open condition by virtue of having the screen unlocked or in the closed condition by virtue of having the screen locked. Accordingly, the open condition and closed condition may be either an actual physical condition or a virtual condition. The second mobile computing device may be, without limitation, selected from a smartphone, wearable computing device such as a smart watch, tablet computer, laptop computer or desktop computer. In fact, the method may send the notification to multiple second mobile computing devices.

The first mobile computing device may be configured to automatically enter the sleep state, for example, in response to detecting a level of inactivity exceeding predetermined inactivity settings stored in hardware or software, or in response to detecting the closed condition. A level of inactivity may be a period of time without any user input or new tasks, such as through cursor movement, keyboard strokes, touchscreen input. A closed condition may be detected in various ways, such as by detecting a lid angle, activating a lid-closed detector or switch, monitoring input to a photo-detector within a display screen, or monitoring input to a camera.

In certain embodiments, the method may determine whether a mobile computing device has left a sleep state by detecting greater than a predetermined increase in one or more operating parameter of the mobile computing device. For example, the one or more operating parameter may be selected from power consumption of the first mobile computing device, a temperature within the first mobile computing device, and utilization of one or more component of the first mobile computing device. Alternatively, the method may monitor for an exposed system state, device state or processor state under the Advanced Configuration and Power Interface (ACPI) specification. Optionally, the notification may further include a value for each of the one or more operating parameters.

The notification may be transmitted wirelessly using a wireless technology selected from near field communication, a mobile personal area network, wireless local area network, and a cellular communication network. For example, the first and second mobile computing devices may be equipped with hardware and software systems for exchanging data over short distances using a wireless technology standard to form a personal area network (PAN). One such wireless technology standard is known as Bluetooth™ (a trademark of the Bluetooth Special Interest Group) and is set out in IEEE 802.15.1. For example, a computing device, such as a laptop computer, table computer or mobile smartphone, may meet the Bluetooth SIG standards and may therefore be referred to as a Bluetooth™ device. This capability may be included in original equipment or may be added as a Bluetooth™ USB dongle or internal Bluetooth™ card. A personal area network, such as Bluetooth™, is particularly useful for establishing short range connections between devices for the purpose of providing a service. The process of establishing such a connection between two compatible devices may be referred to as "pairing". For example, a computing device may be setup to discover any nearby Bluetooth™ compatible devices. After discovery such as device, a user of the computing device may determine whether or not to pair with a second device or accessory, and indicate whether to allow subsequent automatic connections between the two devices when in range without having to repeatedly perform manual pairing steps and decisions. Furthermore, the first and second mobile computing devices may be equipped with hardware and software systems for sending and receiving messages over a wireless network, such as Wi-Fi™, or a cellular communication network, such as a mobile phone network.

The method of the first mobile computing device may further comprise receiving an instruction from the second mobile computing device, and executing the instruction. The instruction may be transmitted by the second mobile computing device using the same wireless technology that the first mobile computing device used to transmit the notification. According to various embodiments of the method, the first mobile computing device will receive and execute the instruction to take the selected one or more action. One of the potential benefits of the present invention is that the one or more action may be initiated by the user and executed by the first mobile computing device without requiring physical access to the first mobile computing. Accordingly, if the first mobile computing device has been closed and packed away, such as in a backpack or suitcase, a notification that the first mobile computing device has left the sleep may be sent to a second mobile computing device, which is then used to input instructions identifying actions that the first mobile computing device should take to avoid damage or battery exhaustion.

While embodiments of the present invention allow for user input regarding the actions to be taken, the method may further include automatically forcing the first mobile computing device back into the sleep state in response to detecting that the first mobile computing device has left the sleep state, remains in the closed condition, and has one or more predetermined operating conditions selected from a rate of battery power consumption, a battery power level, and one or more component temperatures. For example, notifications and user input may be used to advantage under certain operating conditions, while automatic predetermined actions may be taken under certain other operating conditions. In one option, the notification and prompt are sent to the second mobile computing device, but if no user input and instruction is received during a certain time period or before operating conditions reach a second threshold then the predetermined actions may be automatically taken.

In one option, the step of executing the instruction includes forcing the first mobile computing device back into the sleep state. In another option, the step of executing the instruction includes allowing the first mobile computing device to complete a scheduled task prior to returning to the sleep state, wherein the schedule task is selected from a system backup, system maintenance, and software updates. In a further option, the step of executing the instruction includes delaying return to the sleep state for a predetermined period of time.

Another embodiment of the present invention provides a computer program product comprising a non-transitory computer readable storage medium having program instructions embodied therewith, wherein the program instructions are executable by a processor to cause the processor to perform a method of a first mobile computing device. The method comprises storing a wireless communication address of a second mobile computing device, determining that the first mobile computing device has left a sleep state while in a closed condition, and automatically wirelessly transmitting a notification to the second mobile computing device in response to determining that the first mobile computing device has left the sleep state while in a closed condition.

The foregoing computer program products may further include program instructions for implementing or initiating any one or more aspects of the methods of the first mobile computing device described herein. Accordingly, a separate description of the methods will not be duplicated in the context of a computer program product.

Yet another embodiment of the present invention provides a method of a second mobile computing device. The method comprises receiving a wireless notification from a first mobile computing device indicating that the first mobile computing device has left a sleep state while in a closed condition, and providing an alert to a user of the second mobile computing device in response to receiving the wireless notification. Providing the alert may include displaying the notification.

The second mobile computing device may prompt the user for user input via the second mobile computing device to select one or more action to be taken by the first mobile computing device to avoid any operating conditions causing a hard shutdown of the first mobile computing device. The notification may include text, icons or other graphical to communicate that the first mobile computing device is in need of user action, and may optionally identify the details or values regarding the one or more operating conditions of the first mobile computing device that caused notification to be sent. The prompt may include text and/or buttons from which the user may select one or more action to be taken by the first mobile computing device so that the first mobile computing device may avoid operating conditions that would cause a hard shutdown.

The second mobile computing device, such as a smartphone, receives the user input and wirelessly transmits an instruction to the first mobile computing device in response to the user input, wherein the instruction identifies the selected one or more action to be taken. For example, the user input may result in an instruction for the first mobile computing device to take one or more action, such as returning to a sleep state, allowing the first mobile computing device to complete a scheduled task prior to returning to the sleep state or delaying return to the sleep state for a predetermined period of time. A non-limiting list of such scheduled tasks includes a system backup, system maintenance, and software update. These scheduled tasks may be responsible for the first computing device leaving the sleep state in the first place.

Yet another embodiment of the present invention provides a computer program product comprising a non-transitory computer readable storage medium having program instructions embodied therewith, wherein the program instructions are executable by a processor to cause the processor to perform a method of a second mobile computing device. The method comprises receiving a wireless notification from a first mobile computing device indicating that the first mobile computing device has left a sleep state while in a closed condition, and providing an alert to a user of the second mobile computing device in response to receiving the wireless notification. Providing the alert may include displaying the notification.

The foregoing computer program products may further include program instructions for implementing or initiating any one or more aspects of the methods of the second mobile computing device described herein. Accordingly, a separate description of the methods will not be duplicated in the context of a computer program product.

Figure 1:
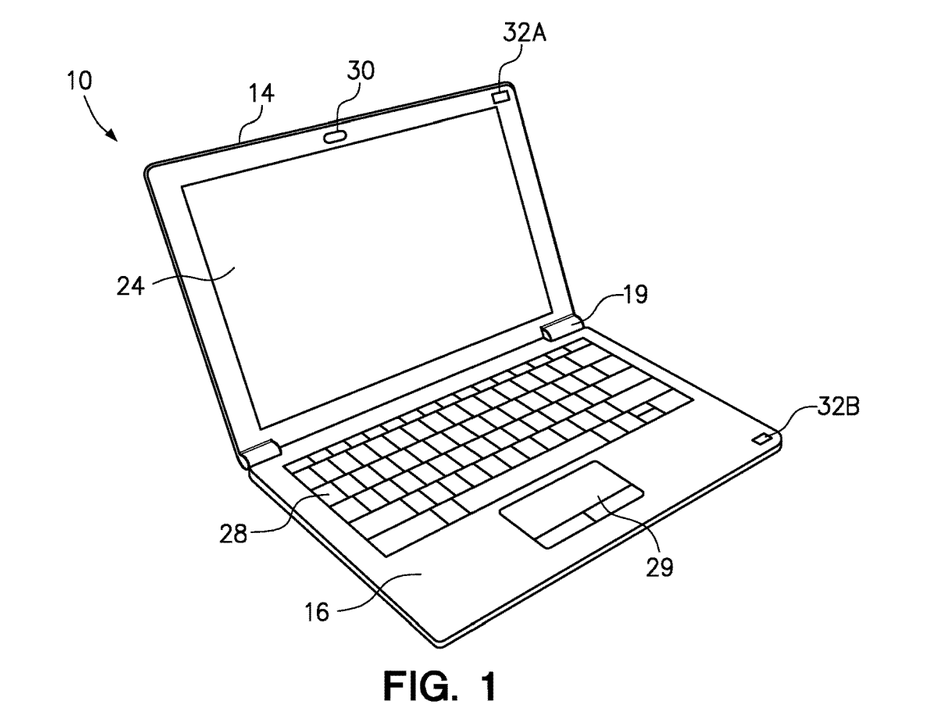
FIG. 1 is a perspective view of a laptop computer.

FIG. 1 is a perspective view of a laptop computer 10. The laptop 10 includes a base portion 16 and a lid portion 14 connected to the base portion 16 by a hinge 19. The base portion 16 includes most of the components of the laptop, such as a processor, memory, data storage and wireless network adapter (components not shown). However, the base portion 16 is shown including a keyboard 28 and a cursor control unit 29, such as a mouse or a trackpad. The lid portion 14 is shown including a display screen 24 and a camera 30. An angle between the base portion 16 and the lid portion 14 may be adjusted by pushing or pulling the lid 14, relative to the base portion 16, with sufficient force to overcome friction in the hinge 19. A first lid sensor 32A is mounted to the lid 14 and a second lid sensor 32B is mounted to the base portion 16 in order to detect that when the lid is in a closed condition.

Figure 2:
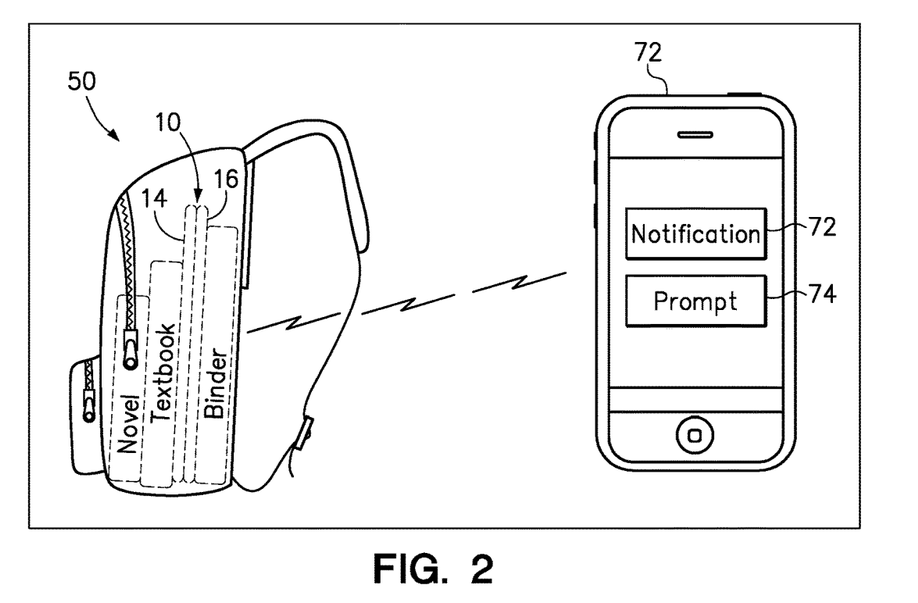
FIG. 2 is a diagram of a laptop computer being carried in a backpack and communicating with a smartphone.

FIG. 2 is a diagram of the laptop computer 10 being carried in a backpack 50 and communicating with a smartphone 70. The laptop computer 10 is in a closed condition with the lid 14 parallel to, and engage with, the base portion 16. Furthermore, the laptop computer 10 is positioned between a binder and a textbook, such that the laptop computer is physically constrained to the extent that the cooling system of the laptop computer may be ineffective. Should be laptop computer 10 exit a sleep state in this closed condition, the laptop computer may quickly experience a high thermal condition or otherwise consume any remaining battery power.

In accordance with embodiments of the present invention, the laptop computer 10 sends a notification to the smartphone 70, which displays the notification 72 and a prompt 74 for user input designating actions that the laptop 10 should take to avoid damaging thermal conditions or a hard shutdown. Two way communication may be established between the first and second mobile computing devices via a standard communication protocol, such as Bluetooth™, Wi-Fi™, or a cellular communication network.

Figure 3:
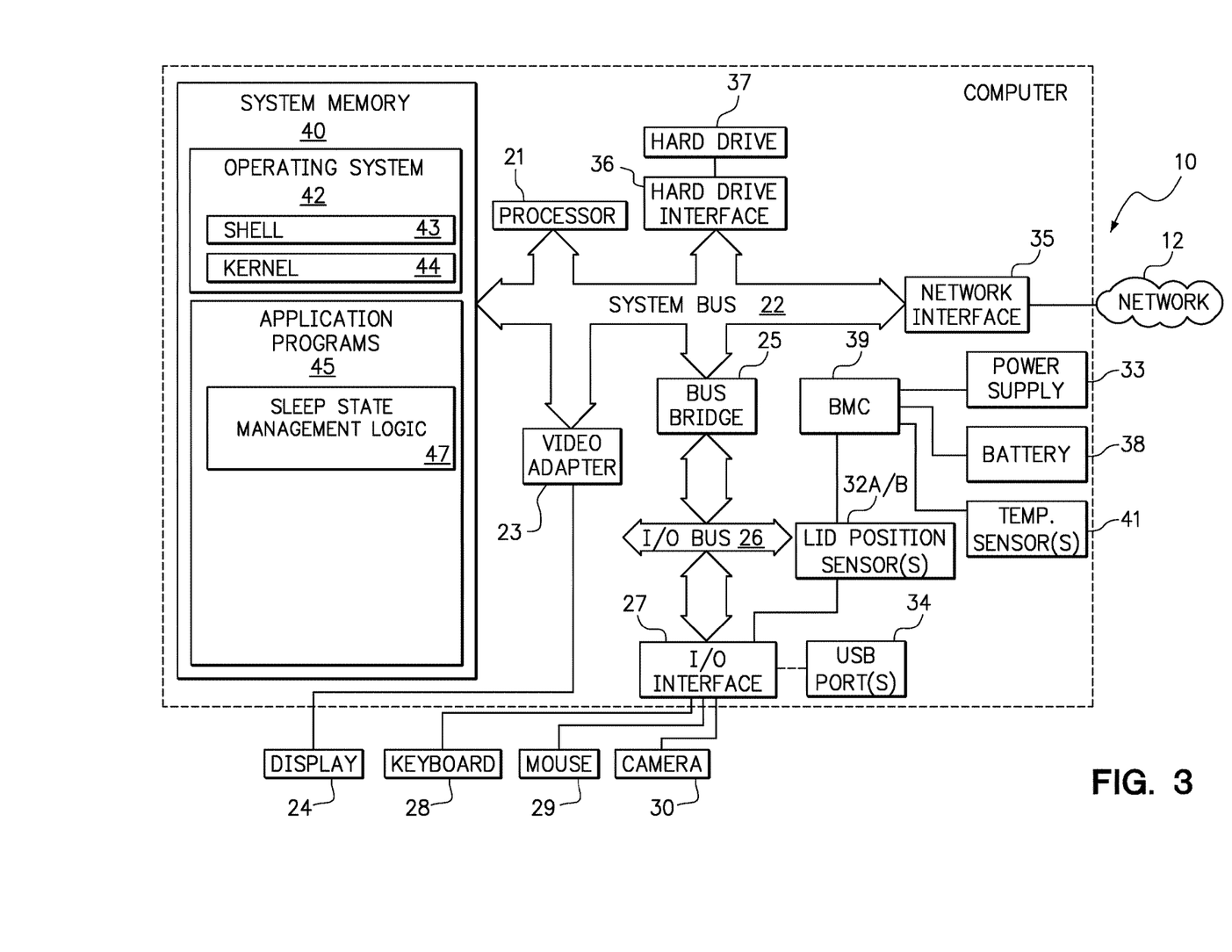
FIG. 3 is a diagram of a mobile computing device, such as a laptop computer, that is capable of implementing methods of the present invention.

FIG. 3 is a diagram of the laptop computer 10 (first mobile computing device) that is capable of implementing methods of the present invention. In this non-limiting example, the compute node 10 includes a processor unit 21 that is coupled to a system bus 22. The processor unit 21 may utilize one or more processors, each of which has one or more processor cores. A video adapter 23, which drives/supports a display 24, is also coupled to the system bus 22. The system bus 22 is coupled via a bus bridge 25 to an input/output (I/O) bus 26. An I/O interface 27 is coupled to the I/O bus 26 and provides communication with various I/O devices, including a keyboard 28, a mouse 29, a camera 30, lid sensors 32A/B, and USB port(s) 34. As shown, the compute node 10 is able to communicate with remote devices via the network 12 using a network adapter or network interface controller 35.

The laptop computer 10 may further includes a baseboard management controller 39 or other service processor for monitoring the power supply 33, battery 38 and temperature sensors 41. Optionally, the baseboard management controller 39 may also monitor the lid sensors 32A/B. While the baseboard management controller 39 may take certain actions on its own, the baseboard management controller 39 may also communicate with the operating system 42 and pass information to one or more of the applications programs 45. A hard drive interface 36 is also coupled to the system bus 22 and interfaces with a hard disk drive 37. In a preferred embodiment, the hard disk drive 37 communicates with system memory 40, which is also coupled to the system bus 22. System memory includes the lowest level of volatile memory in the compute node 20. This volatile memory may include additional higher levels of volatile memory (not shown), including, but not limited to, cache memory, registers and buffers. Data that populates the system memory 40 may include an operating system (OS) 42 and application programs 45.

The operating system 42 includes a shell 43 for providing transparent user access to resources such as application programs 45. Generally, the shell 43 is a program that provides an interpreter and an interface between the user and the operating system. More specifically, the shell 43 executes commands that are entered into a command line user interface or from a file. Thus, the shell 43, also called a command processor, is generally the highest level of the operating system software hierarchy and serves as a command interpreter. The shell provides a system prompt, interprets commands entered by keyboard, mouse, or other user input media, and sends the interpreted command(s) to the appropriate lower levels of the operating system (e.g., a kernel 44) for processing. Note that while the shell 43 is a text-based, line-oriented user interface, the present invention will equally well support other user interface modes, such as graphical, voice, gestural, etc.

As depicted, the operating system 42 also includes the kernel 44, which includes lower levels of functionality for the operating system 42, including providing essential services required by other parts of the operating system 42 and application programs 45, including memory management, process and task management, disk management, and mouse and keyboard management. The application programs 45 in the system memory of the compute node 20 may include, without limitation, sleep state management logic 47, according to one embodiment such as that shown in FIG. 5. Optionally, all or part of these applications 45 may be included as part of the operating system 42 or executed by the baseboard management controller 39.

The hardware elements depicted in the compute node 10 are not intended to be exhaustive, but rather are representative. For instance, the compute node 10 may include alternate memory storage devices such as magnetic cassettes, digital versatile disks (DVDs), Bernoulli cartridges, and the like. These and other variations are intended to be within the scope of the present invention.

Figure 4:
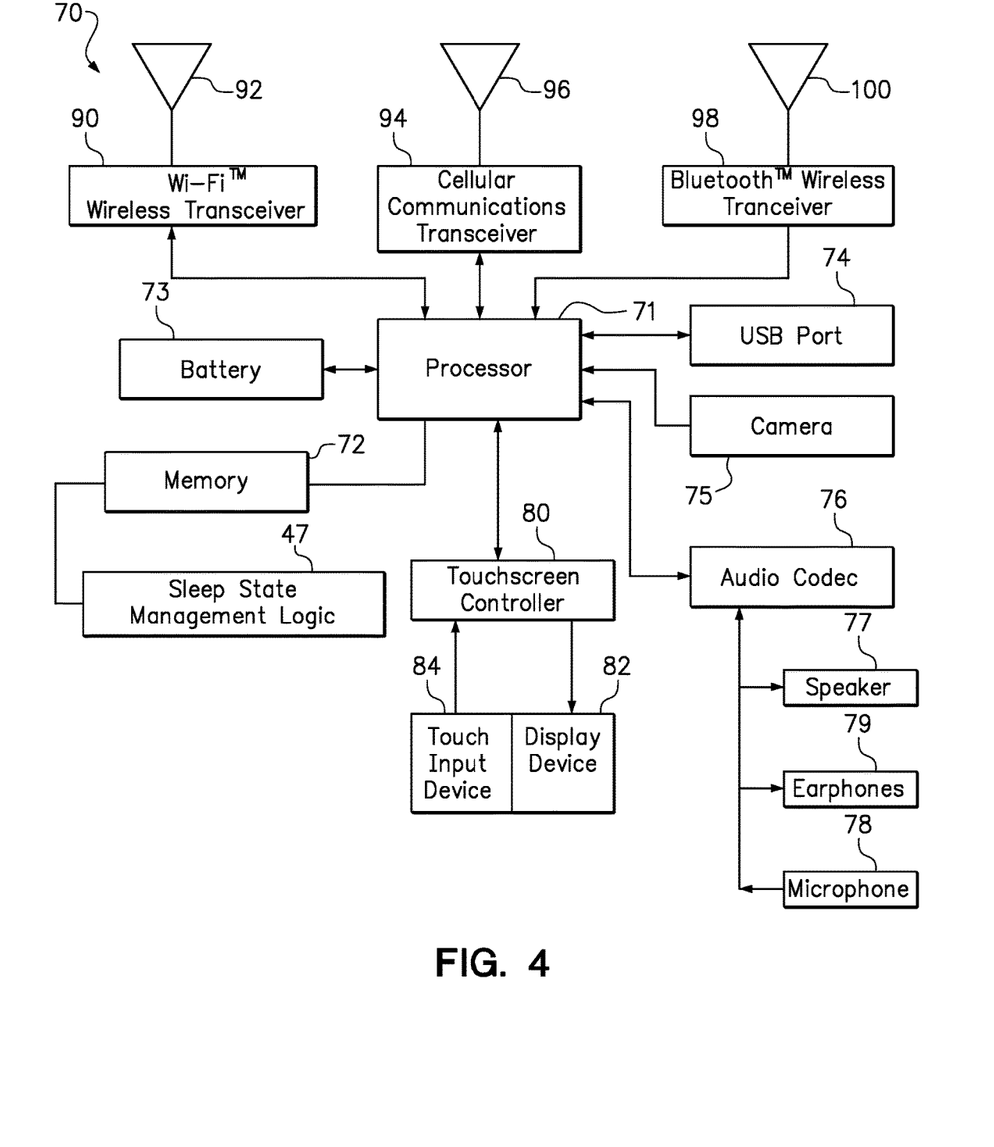
FIG. 4 is a diagram of a mobile computing device, such as a smartphone, that is capable of implementing methods of the present invention.

FIG. 4 is a diagram of a smartphone 70 (second mobile computing device) that is capable of implementing methods of the present invention. The smartphone 70 may include a processor 71, memory 72, a battery 73, a universal serial bus (USB) port 74, a camera 75, and an audio codec 76 coupled to a built-in speaker 77, a microphone 78, and an earphone jack 79. The smartphone 70 may further include a touchscreen controller 80 which provides a graphical output to the display device 82 and an input from a touch input device 84. Collectively, the display device 82 and touch input device 84 may be referred to as a touchscreen. The touchscreen may be in either a locked condition or an unlocked condition. The touchscreen is fully functional in the unlocked condition, but, when the touchscreen is in the locked condition, the touch input device 84 will ignore all attempted input other than a specific unlocking gesture.

The smartphone 70 may also include a Wi-Fi™ wireless transceiver 90 and corresponding antenna 92, a cellular communications transceiver 94 and corresponding antenna 96, and a Bluetooth™ wireless transceiver 98 and corresponding antenna 100. Accordingly, the Bluetooth™ wireless transceiver 98 enables communication between the smartphone 70 and the laptop computer 10 (See FIGS. 1-3). In order to implement one or more embodiment of the present invention, the memory 72 may communication interface, such as sleep state management logic 47. It should be recognized that certain functions of the invention are executed by the first mobile computing device, such as the laptop computer 10, and certain other functions of the invention are executed by the second mobile computing device, such as the smartphone 70. Accordingly, each device may store that portion of the sleep state management logic 47 for which the respective device is responsible. Furthermore, in various instances, such as where the first and second computing devices are both laptop computers, each of the devices may include a separate instance of the entire sleep state management logic 47. Accordingly, each of the devices may function as the first mobile computing device in some situations, yet function as the second mobile computing device in other situations.

Figure 5:
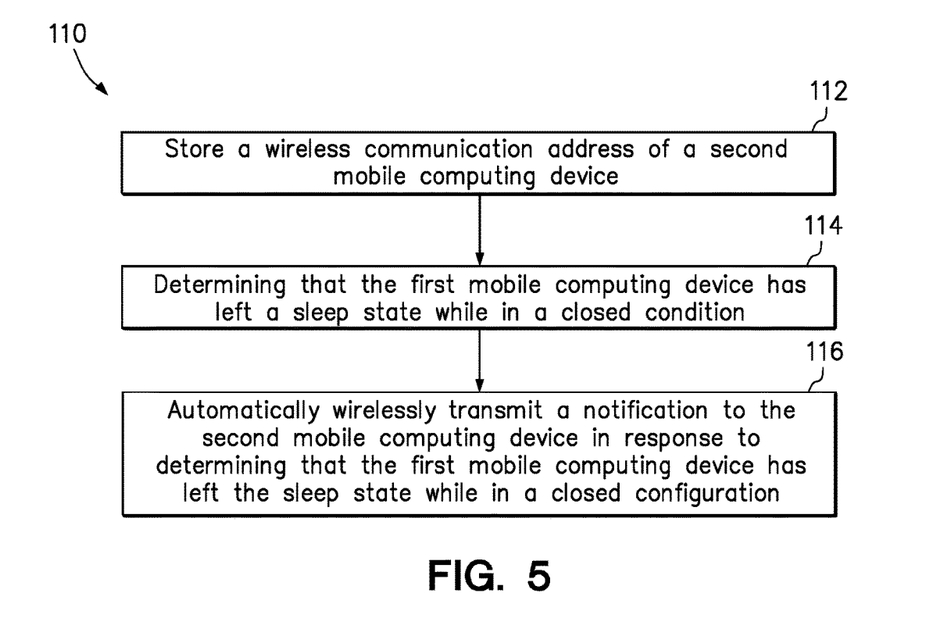
FIG. 5 is a flowchart of a method of a first mobile computing device according to one embodiment of the present invention.

FIG. 5 is a flowchart of a method 110 of a first mobile computing device according to one embodiment of the present invention. In step 112, the method stores a wireless communication address of a second mobile computing device. In step 114, the method determines that the first mobile computing device has left a sleep state while in a closed condition. In step 116, the method automatically wirelessly transmits a notification to the second mobile computing device in response to determining that the first mobile computing device has left the sleep state while in a closed condition.

Figure 6:
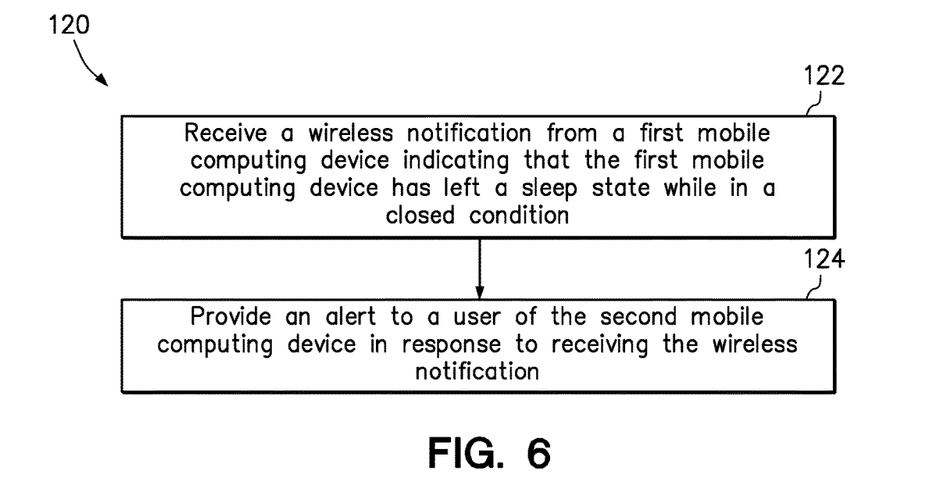
FIG. 6 is a flowchart of a method of a second mobile computing device according to another embodiment of the present invention.

FIG. 6 is a flowchart of a method 120 of a second mobile computing device. In step 122, the method receives a wireless notification from a first mobile computing device indicating that the first mobile computing device has left a sleep state while in a closed condition. In step 124, the method provides an alert to a user of the second mobile computing device in response to receiving the wireless notification.

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

Any combination of one or more computer readable storage medium(s) may be utilized. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: a portable computer diskette, a hard disk, a random access memory (RAM), a read-only memory (ROM), an erasable programmable read-only memory (EPROM or Flash memory), a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device. Furthermore, any program instruction or code that is embodied on such computer readable storage medium (including forms referred to as volatile memory) is, for the avoidance of doubt, considered "non-transitory".

Program code embodied on a computer readable storage medium may be transmitted using any appropriate medium, including but not limited to wireless, wireline, optical fiber cable, RF, etc., or any suitable combination of the foregoing. Computer program code for carrying out operations for aspects of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention may be described with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, and/or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored as non-transitory program instructions in a computer readable storage medium that can direct a computer, other programmable data processing apparatus, or other devices to function in a particular manner, such that the program instructions stored in the computer readable storage medium produce an article of manufacture including non-transitory program instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

The flowchart and block diagrams in the Figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, components and/or groups, but do not preclude the presence or addition of one or more other features, integers, steps, operations, elements, components, and/or groups thereof. The terms "preferably," "preferred," "prefer," "optionally," "may," and similar terms are used to indicate that an item, condition or step being referred to is an optional (not required) feature of the invention.

The corresponding structures, materials, acts, and equivalents of all means or steps plus function elements in the claims below are intended to include any structure, material, or act for performing the function in combination with other claimed elements as specifically claimed. The description of the present invention has been presented for purposes of illustration and description, but it is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated.

What is claimed is:

1. A method of a first mobile computing device, comprising:
   storing a wireless communication address of a second mobile computing device;
   determining that the first mobile computing device has left a sleep state and is in a closed condition; and
   automatically wirelessly transmitting a notification to the second mobile computing device in response to determining that the first mobile computing device has left the sleep state and is in a closed condition.

2. The method of claim 1, further comprising:
   receiving an instruction from the second mobile computing device; and
   executing the instruction.

3. The method of claim 2, wherein executing the instruction includes forcing the first mobile computing device back into the sleep state.

4. The method of claim 2, wherein executing the instruction includes allowing the first mobile computing device to complete a scheduled task prior to returning to the sleep state, wherein the schedule task is selected from a system backup, system maintenance, and software updates.

5. The method of claim 2, wherein executing the instruction includes delaying return to the sleep state for a predetermined period of time.

6. The method of claim 1, wherein determining that the first mobile computing device has left a sleep state includes detecting greater than a predetermined increase in one or more operating parameter of the first mobile computing device.

7. The method of claim 6, wherein the notification further includes a value for each of the one or more operating parameter of the first mobile computing device.

8. The method of claim 6, wherein the one or more operating parameter is selected from power consumption of the first mobile computing device, a temperature within the first mobile computing device, and utilization of one or more component of the first mobile computing device.

9. The method of claim 1, further comprising:
   automatically forcing the first mobile computing device back into the sleep state in response to detecting that the first mobile computing device has left the sleep state, remains in the closed condition, and has one or more operating parameter exceeding a predetermined threshold selected from a predetermined rate of battery power consumption, a predetermined battery power level, and one or more predetermined component temperatures.

10. The method of claim 1, wherein the notification is transmitted wirelessly using a wireless technology selected from near field communication, a mobile personal area network, wireless local area network, and a cellular communication network.

11. The method of claim 1, further comprising:
    entering the sleep state in response to detecting a level of inactivity exceeding predetermined inactivity settings stored in hardware or software.

12. The method of claim 1, further comprising:
entering the sleep state in response to detecting the closed condition.

13. The method of claim 1, wherein the first mobile computing device is a tablet computer secured to a hinged case that may be in an open condition or the closed condition relative to the tablet computer.

14. The method of claim 1, wherein the first mobile computing device is a laptop computer having a base and a hinged display screen that may be in an open condition or the closed condition relative to the base.

15. The method of claim 1, wherein the first mobile computing device is a tablet computer, and wherein the first mobile computing device may be in an open condition by having an unlocked screen and may be in a closed condition by having a locked screen.

16. A computer program product comprising a non-transitory computer readable storage medium having program instructions embodied therewith, the program instructions executable by a processor to cause the processor to perform a method comprising:
storing a wireless communication address of a second mobile computing device;
determining that the first mobile computing device has left a sleep state and is in a closed condition; and
automatically wirelessly transmitting a notification to the second mobile computing device in response to determining that the first mobile computing device has left the sleep state and is in a closed condition.

17. A method of a second mobile computing device, comprising:
receiving a wireless notification from a first mobile computing device indicating that the first mobile computing device has left a sleep state and is in a closed condition; and
providing an alert to a user of the second mobile computing device in response to receiving the wireless notification.

18. The method of claim 17, wherein providing the alert includes displaying the notification.

19. The method of claim 18, further comprising:
prompting for user input to select one or more action to be taken by the first mobile computing device to avoid any operating parameter causing a hard shutdown of the first mobile computing device;
receiving user input identifying one or more selected action to be taken by the first mobile computing device; and
wirelessly transmitting an instruction to the first mobile computing device in response to the user input, wherein the instruction identifies the selected one or more action to be taken.

20. The method of claim 19, wherein the second mobile computing device is a smartphone.

21. An apparatus, comprising:
a first mobile computing device including at least one storage device for storing program instructions and at least one processor for processing the program instructions to:
store a wireless communication address of a second mobile computing device;
determine that the first mobile computing device has left a sleep state and is in a closed condition; and
automatically wirelessly transmit a notification to the second mobile computing device in response to determining that the first mobile computing device has left the sleep state and is in a closed condition.

* * * * *